United States Patent [19]

Nakane et al.

[11] Patent Number: 4,881,948

[45] Date of Patent: Nov. 21, 1989

[54] GAS SHUTOFF APPARATUS

[75] Inventors: Shinichi Nakane, Yamatokouriyama; Takashi Uno, Nara; Hiroshi Horii; Shinzo Kato, both of Katsushika; Mitsuo Namba, Machida; Reppei Uematsu, Yokohama, all of Japan

[73] Assignees: Matsushita Electric Industrial Co., Ltd., Kadoma; The High Pressure Gas Safety Institute of Japan, Tokyo, both of Japan

[21] Appl. No.: 324,055

[22] Filed: Mar. 16, 1989

[30] Foreign Application Priority Data

Mar. 17, 1988 [JP] Japan .................................. 63-64011
Jun. 16, 1988 [JP] Japan ................................. 63-148571

[51] Int. Cl.⁴ .......................... F23K 5/00; G05D 7/00
[52] U.S. Cl. ...................................... 48/192; 137/460
[58] Field of Search ................................. 48/190–192, 48/DIG. 10; 137/456, 459, 460

[56] References Cited

U.S. PATENT DOCUMENTS 2,059,411 11/1936 Stubblefield et al. ................. 48/192
4,420,139 12/1983 Belov .................................... 48/192

FOREIGN PATENT DOCUMENTS 57-195978 12/1982 Japan ................................... 137/460
58-24672 2/1983 Japan ................................... 137/459
63-101619 5/1988 Japan .

Primary Examiner—Peter Kratz
Attorney, Agent, or Firm—Cushman, Darby & Cushman

[57] ABSTRACT

A gas flow rate is measured and therefrom "consumption state" defined by combination of maximum flow rate, increase of total amount and a consumption time of the gas is detected, and then, the consumption state is compared with a "reference consumption condition" representing a predetermined consumption state; and when the "consumption state" exceeds the "reference consumption condition", a gas control means interrupt supply of the gas; and thereafter, after restoration of the gas control means to gas supply state, the actual gas consumption state is measured for a predetermined time counted by timer when the gas flow rate exceeds a predetermined level.

4 Claims, 7 Drawing Sheets

GAS SHUTOFF APPARATUS

FIELD OF THE INVENTION AND RELATED ART STATEMENT

1. Field of the Invention

The present invention relates generally to a gas shutoff apparatus for a gas equipment using a town gas or liquefied petroleum gas, and more particularly to a gas shutoff apparatus for preventing gas explosion or gas poisoning due to a gas leakage from a gas supply tube or gas equipment.

2. Description of the Related Art

The greater part of gas accidents are caused by escape of unburned gas such as town gas or liquefied petroleum gas (hereinafter is referred to as the gas). The gas escapes when a main cock for supplying the gas to a gas equipment is opened without burning of the gas, when unexpected disconnection of a rubber tube supplying the gas to the gas equipment occurs or the rubber tube has cracks thereon, for example. In order to prevent escape of the gas in the prior art, an automatic shutoff valve, a reinforced tube, an alarm to detect the escaping gas and an automatic gas shutoff system which is connected to the alarm etc. are used.

However, the automatic shutoff valve usually cannot be activated under a small flow rate of the escaping gas, and the escape of the gas cannot be interrupted. On the other hand, in the gas alarm, it only generates an alarm, and therefore, if a person is absent from there or fails to notice it, the main cock cannot be shut, and dangerous escape of the gas cannot be interrupted. Furthermore, with regard to the automatic gas shutoff system connected to the alarm, installation of such system to existing houses is difficult owing to its high cost and necessity of connecting construction. Moreover, the above-mentioned conventional countermeasures are not effective to gas suicide which is liable to cause gas explosion.

In order to improve these defects, recently, a gas shutoff apparatus for preventing the gas explosion or gas suicide has been developed for household use. In such gas shutoff apparatus, a flow rate of the gas is detected, and when the flow rate exceeds a predetermined total flow rate per a predetermined time period, occurrence of an abnormal state is detected and supply of the gas is interrupted (by shutoff function at excess of a predetermined total flow rate). Then, when the flow rate greatly increases and is significantly larger than a predetermined flow rate, an abnormal state is detected, and supply of the gas is interrupted (by shutoff function at excess of a predetermined limit of flow rate). Moreover, when the gas equipment continuously consumes gas without variation of a flow rate, and the time of continuous gas consumption with the flow rate exceeds a predetermined time period which is determined corresponding to an average normal consumption rate thereof, the state is detected as an abnormal state and supply of the gas is interrupted (by gas shutoff function at excess of a predetermined continuous use time).

The respective predetermined reference values of these "total flow rates", "limit of increase of flow rate" and "continuous use time" are decided, for example, corresponding to a rated measurement capacity in the respective consumer. A prior art gas shutoff apparatus embodying the above-mentioned method is disclosed in the Japanese published unexamined patent application (Tokkai) Sho 63-101619 and 108118, for example.

FIG. 1 is the block diagram of the prior art gas shutoff apparatus of the Tokkai Sho 63-101619. Referring to FIG. 1, a flow rate measurement means 1 detects a flow rate of the gas flowing from a gas supply tube to a gas equipment, and it generates a flow rate signal corresponding to the flow rate. A consumption state detection means 2 detects a "consumption state" which is represented by a maximum flow rate, a total amount of gas consumption or a time period of continuous gas consumption, on the basis of the flow rate signal.

A "reference consumption condition" is represented by combination of reference values of the "maximum gas flow rate", the "total amount of gas consumption and the "time period of continuous gas consumption". Therefore, the words "reference consumption condition generally imply any one of the above-mentioned three. These values are used as reference condition to produce a shutoff signal. An "intial consumption condition" is determined by an initial consumption condition setting means 3. Then the initial consumption condition is set or varied in a varying means 10 in compliance to the reference consumption condition for starting operation of the gas shutoff apparatus.

Data of the reference consumption condition of the varying means 10 for reference consumption condition is applied to a consumption state judging means 4. Further, data of the consumption state detection means 2 is also applied to the consumption state judging means 4. The data of the consumption state detection means 2 is compared with the data of the reference consumption condition at the consumption state judging means 4. Then, when value of the consumption state exceeds that of the reference consumption condition, and a shutoff signal for closing a valve is issued to the shutoff means 5.

A timer 7 measures a predetermined time period by means of a starting signal which is issued from a starting signal generating means 8. A consumption state memory means 9 memorizes the consumption state of the house, wherein this gas shutoff apparatus is installed, on the basis of the flow rate signal issued from the flow rate measurement means 1 during an operation time period of the timer 7. The time period is selected in the order of two weeks or one month, for example. Then the "total amount of the gas consumption, the "maximum gas flow rate" and the "time period of continuous gas consumption", which are measured on the basis of the flow rate signal of the flow rate measurement means 1, are memorized in the consumption state memory means 9 from start of the timer 7. A state represented by a combination consisting of three kinds data, namely, the total amount of gas consumption, the maximum gas flow rate and the time period of continuous gas consumption is hereafter defined as "a gas consumption state". Memorized data in the consumption state memory means 9 represents pattern of the gas consumption state. The maximum data of the gas consumption state is applied to the varying means 10 for reference consumption condition, and is compared with the data of the initial consumption condition set in the initial consumption setting means 3 after a finishing of the counting operation of the timer 7. Subsequently, in case that the maximum data is different from the data of the initial consumption condition, the maximum data is set in the varying means 10 for consumption state, as a new reference consumption condition. After once setting the new reference consumption condition, a consumption state is compared with the new reference consumption condition.

A reset signal generator 6 generates a reset signal upon receipt of signal of open-state from the shutoff means 5 when it is opened. The reset signal is given to the starting signal generating means 8, which makes the timer 7 start to count from the beginning to measure the gas consumption state again. At that time, the timer 7 is cleared by the shutoff signal issued from the consumption state judging means 4, and further, output data from the initial consumption condition setting means 3 is cleared and the initial consumption condition is set as a reference consumption condition.

However, in the above-mentioned constitution, from the point of time when the starting signal generating means 8 operates, for instance from the time when a pushbutton switch is pressed at first, or when an outside signal transfer means operates, the shutoff means 5 restores. Therefore, the time-counting starts from the time when the reset signal is inputted to the starting signal generating means 8. Consequently, there is such problem that useless and undesirable time-counting is carried out when no actual gas consumption is made, for instance, due to a long time travelling.

OBJECT AND SUMMARY OF THE INVENTION

An object of the present invention is to provide a gas shutoff apparatus wherein a consumption state of gas in each gas-consumer is measured at intervals of a predetermined time period and is compared with a reference consumption condition; and when the consumption state is different from the reference consumption condition, the reference consumption condition is changed so as to correspond to the present consumption state.

The gas shutoff apparatus in accordance with the present invention comprises:

flow rate measurement means for generating a flow rate signal corresponding to a flow rate of gas in a gas supply line, consumption state detection means for detecting a consumption state represented by flow rate and a consumption time of the gas on the basis of the flow rate signal, initial consumption condition setting means comprising a memory for storing a reference consumption condition as an initial condition, consumption state judging means which compares the detected consumption state with the reference consumption condition and generates a gas shutoff signal in case of an excess of the consumption state from the reference consumption condition, a timer for measuring a predetermined time period, a first starting signal generator for generating a first starting signal, a second starting signal generator for generating a second starting signal upon reception of a gas flow rate above a predetermined level, a starting signal judging means which issues a timer-start signal to make the timer-start when the second starting signal is received after reception of the first starting signal, consumption state memory means for memorizing a consumption state during a time period given by operation of the timer and for producing a consumption condition on the basis of the memorized consumption state, varying means for setting a varied reference consumption condition in consumption state judging means 4, shutoff means for interrupting the gas supply by reception of the shutoff signal, and a reset signal generator for generating a reset signal to said first starting signal generator upon reception of signal of open-state from the shutoff means when it is opened.

According to the present invention, an actual or present consumption state is measured during a time period given by the operation of the timer, and a reference consumption condition is set on the basis of the data of the actual consumption state after lapse of the time period of the timer; and that the gas consumption states are always monitored even during the counting of time by the timer and after completion of the time, so that when the gas consumption state exceeds the reference consumption condition the shutoff means is actuated to operate and at the same time the timer and output data from the consumption state memory means are cleared. And, after a reset signal from the reset signal generator is inputted to the first starting signal generator, when a second starting signal generator detects a gas flow rate above a predetermined level the timer is actuated again.

Thus, according to the present invention, during actual time-counting by the timer after an initial and pre-consumption setting of the reference consumption condition, the actual gas consumption state is measured; and the reference consumption data for the consumers home is set again.

DESCRIPTION OF THE PREFERRED EMBODIMENT

Figure 1:
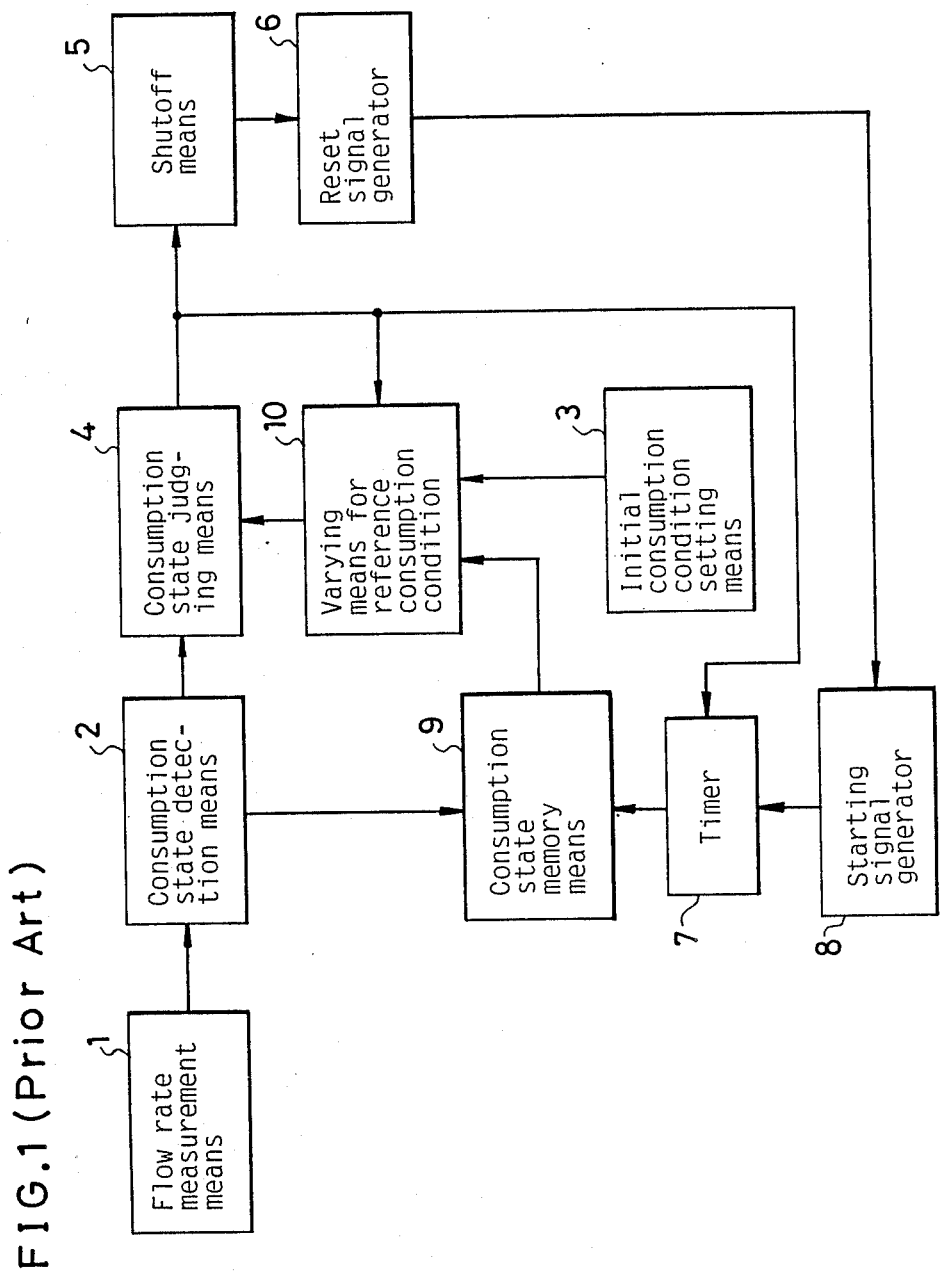
FIG. 1 is the block diagram of the gas shutoff apparatus in the prior art.
Figure 2:
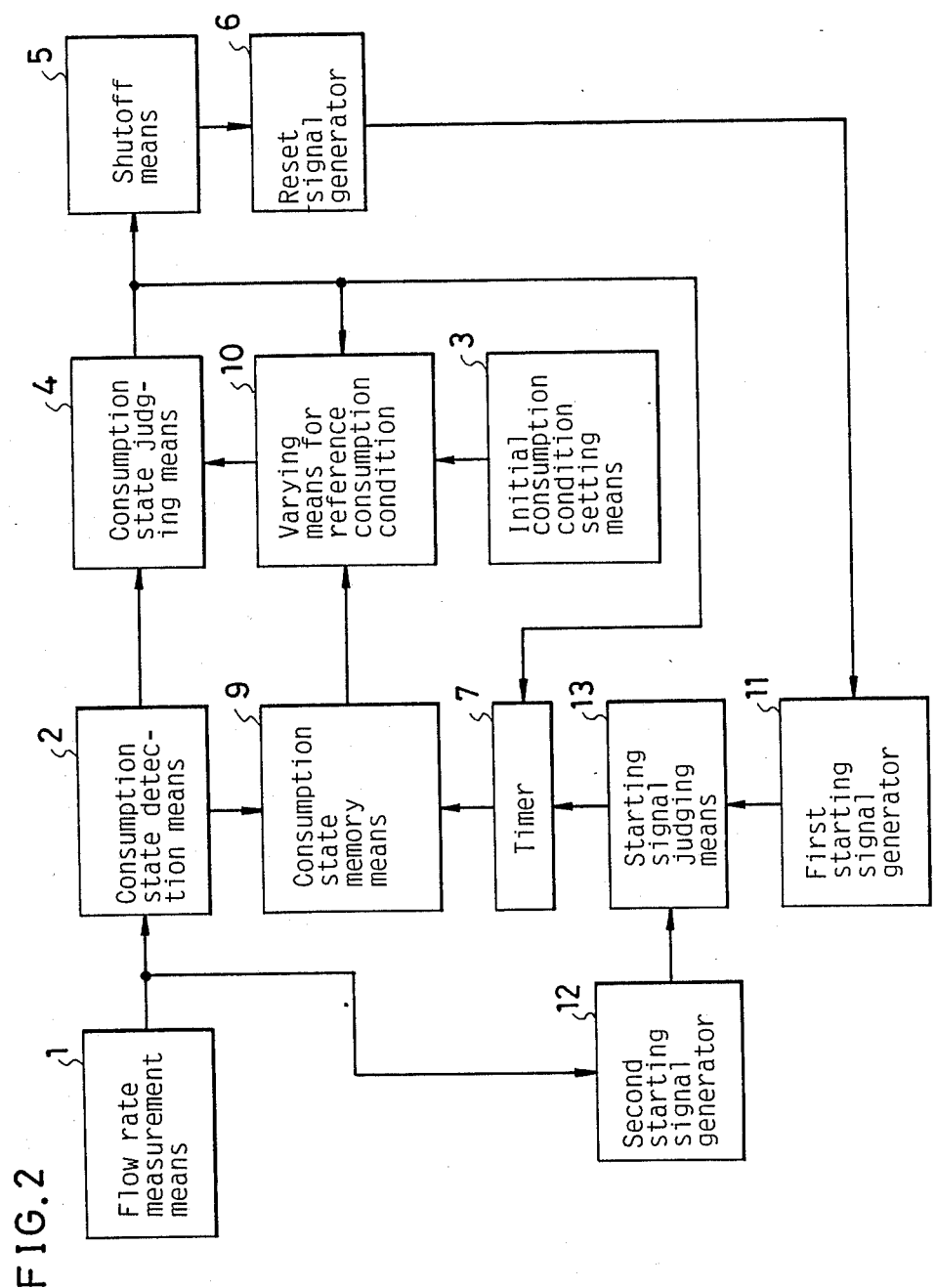
FIG. 2 is a block diagram of a gas shutoff apparatus of a first embodiment in accordance with the present invention.

FIG. 2 is a block diagram of a gas shutoff apparatus of a first embodiment in the present invention. Referring to FIG. 2, a flow rate measurement means 1 detects a flow rate of the gas flowing from a gas supply tube to gas equipment(s), and generates a flow rate signal corresponding to the flow rate. A consumption state detection means 2 detects a "consumption state" of the gas which is representing a maximum flow rate or total flow rate, an increase of total amount in a period or an increase of flow rate of gas consumption, and a time period of continuous gas consumption above a certain level, on the basis of the flow rate signal. A "consumption condition" is a condition for examining the consumption state and is representing the same elements as the above-mentioned three ones. A "reference consumption condition" is reference condition for producing a shutoff signal and represents combination of reference condition values of the "maximum gas flow rate", the "limit of increase of gas flow rate" and the "time period of continuous gas consumption". Therefore, the words "reference consumption condition generally imply any one of the above-mentioned three. An "initial consumption condition" is determined by an initial consumption condition setting means 3. Then the initial consumption condition is set or adjusted in a varying means 10 for reference consumption condition for starting operation of the gas shutoff apparatus.

Data of the reference consumption condition of the varying means 10 for reference consumption condition is applied to a consumption state judging means 4. Further, data of the consumption state detection means 2 is also applied to the consumption state judging means 4, and the data of the consumption state detection means 2 is compared with the data of the reference consumption condition in the consumption state judging means 4. Then, when value of the consumption state exceeds that of the reference consumption condition, a shutoff signal for closing a valve is issued to a shutoff means 5.

A timer 7 measures a predetermined time period by means of a starting signal which is issued from a starting signal judging means 13.

Starting signal judging means 13 issues a timer start signal to make the timer 7 start, when the second starting signal generator 12 detects a gas flow above the predetermined level and gives a second starting signal thereto after reception of the first starting signal from the first starting signal generator 11.

A consumption state memory means 9 memorizes the consumption state on the basis of the flow rate signal from the flow rate measurement means 1 during counting by the timer period by the timer 7. The time period is selected, for instance, in the order of two weeks or one month. Then the consumption state comprising and representing (i) increase of gas flow rate, (ii) maximum gas flow rate and (iii) time period of continuous gas consumption, which are measured by the flow rate signal, is detected and is memorized in the consumption state memory means 9, from start of the timer 7 on.

A reset signal generator 6 generates a reset signal to reset the shutoff means 5, when an opening operation is made to once-closed shutoff means 5 for restoration of use of the gas. The reset signal is inputted to the first starting signal generator 11, which transfers a starting signal to the starting signal judging means 13. Thereafter, when a second starting signal is issued upon detection of gas flow above the predetermined level by the second starting signal generator 12 to the starting signal judging means 13, the latter gives starting signal for time-count to the timer 7. Thereafter, the gas consumption state is memorized during the time-counting in the consumption state memory means 9, and a reference consumption condition is set basing on data of actual gas consumption state observed at the time of completion of the time-counting.

Figure 3:
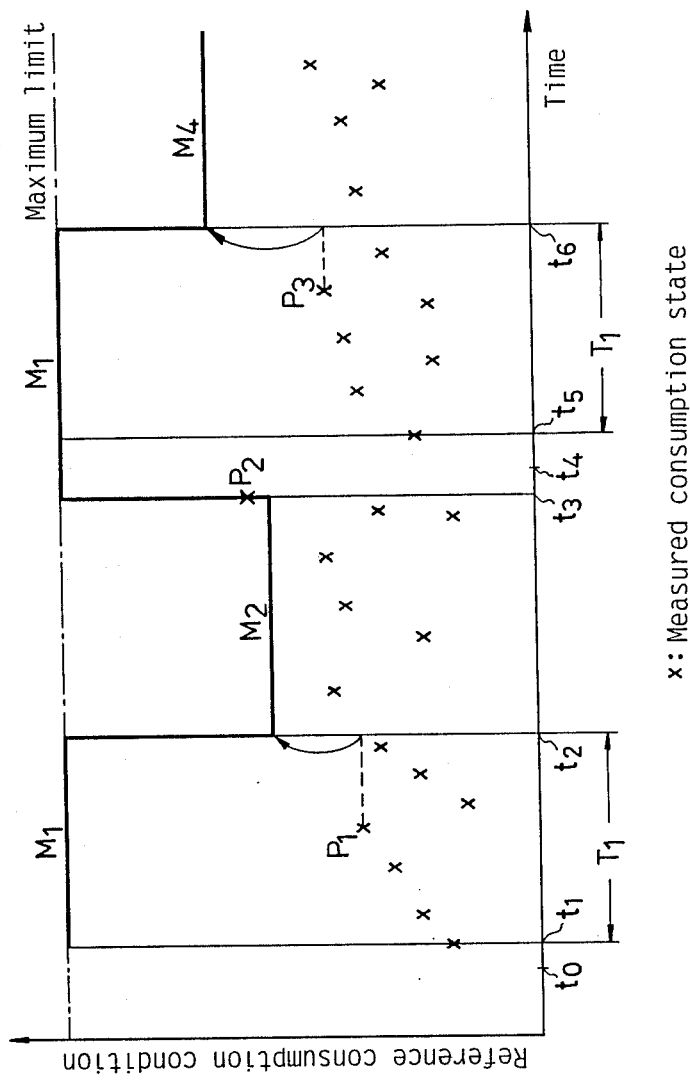
FIG. 3 is a graph of a reference consumption condition in the first embodiment.

FIG. 3 is a graph showing operation of the first embodiment. Referring to the graph the abscissa is graduated by time and the ordinate by a reference consumption condition. Cross marks designate levels of measured consumption states. A maximum limit $M_1$ of a consumption condition is designated by an alternate long and short dash line.

At the point of time $t_0$ the first starting signal generator 11 is activated, and at the time $t_1$ the second starting signal generator 12 detects the excessive gas flow above the predetermined level of reference condition, and the timer 7 starts counting of time.

A time period $T_1$ from the time $t_1$ to a time $t_2$ is an operating time period of the timer 7. The maximum consumption state $P_1$ of plural consumption states which are measured in the time period $T_1$ is selected, and a reference consumption condition $M_2$ is calculated by multiplying the maximum consumption state $P_1$ by a safety factor K (for example, K=1.5) in the consumption state memory means 9. Namely, the reference consumption condition in the time period $T_1$ is equal to the maximum reference consumption condition $M_1$, which is compared with the reference consumption condition $M_2$ in the varying means 10 at the time $t_2$. Then, the lower reference consumption condition $M_2$ is set in the varying means 10 as a new reference consumption condition. In the above-mentioned status, when a consumption state exceeds the reference consumption condition $M_2$, the consumption state judging means 4 detects abnormal state and outputs a signal for activating the shutoff means 5. At the point of time $t_3$, the measured data $P_2$ is above the reference consumption state $M_2$, and hence the output is issued to the shutoff means 5 to shutoff the gas supply. At that time, the reference consumption condition is reset from the level $M_2$ to the maximum limit value $M_1$. Thereafter, at the time $t_4$ the shutoff means is reset, and simultaneously the reset signal is given from the reset signal generator 6 to the first starting signal generator 11.

Subsequently, when a gas flow increases above a predetermined level at the time $t_5$, the second starting signal generator 12 detects the increased gas flow and issues a start signal to the starting signal judging means 13. From the time $t_5$, the timer 7 again starts the time-counting, and a gas consumption state within a second time period $T_1$, which is of equal length to the time period $t_1$ to $t_2$, is stored in the consumption state memory means 9. And at the time $t_6$ when the counting of time by the timer 7 is over, a fresh reference consumption condition $M_4$ is set. To explain a little in detail, in this state, a reference consumption condition $M_4$ (FIG. 3) is computed by multiplying the maximum consumption state $P_3$ by the safety factor K at the point of time $t_6$ completion of operation of the timer 7, and the reference consumption condition $M_4$ is set in the varying means 10. The above-mentioned operation of the gas shutoff apparatus is similarly continued, also after the time $t_6$.

Figure 4:
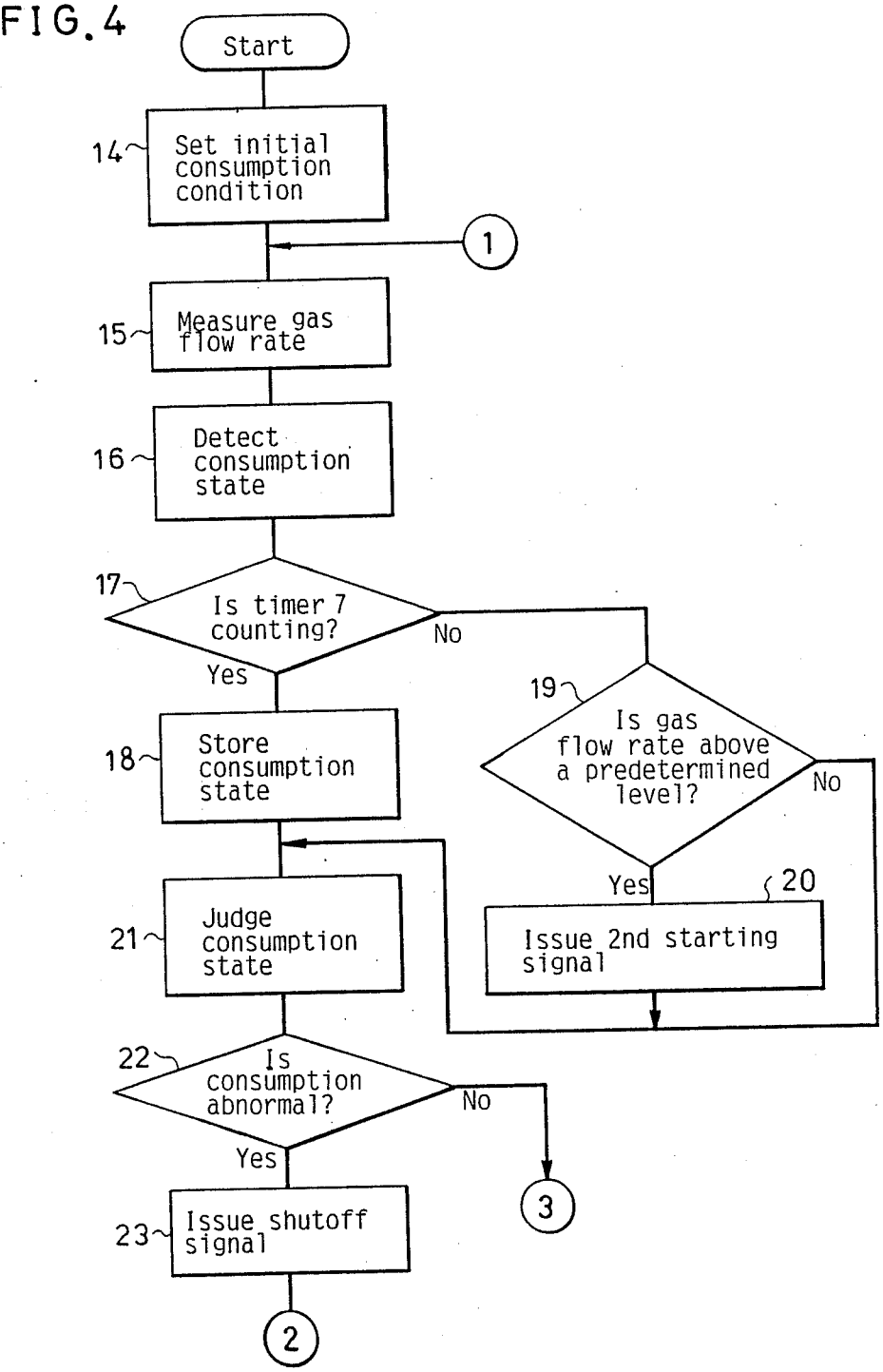
FIG. 4, FIG. 5 and FIG. 6 are flow charts in operation of the first embodiment.
Figure 5:
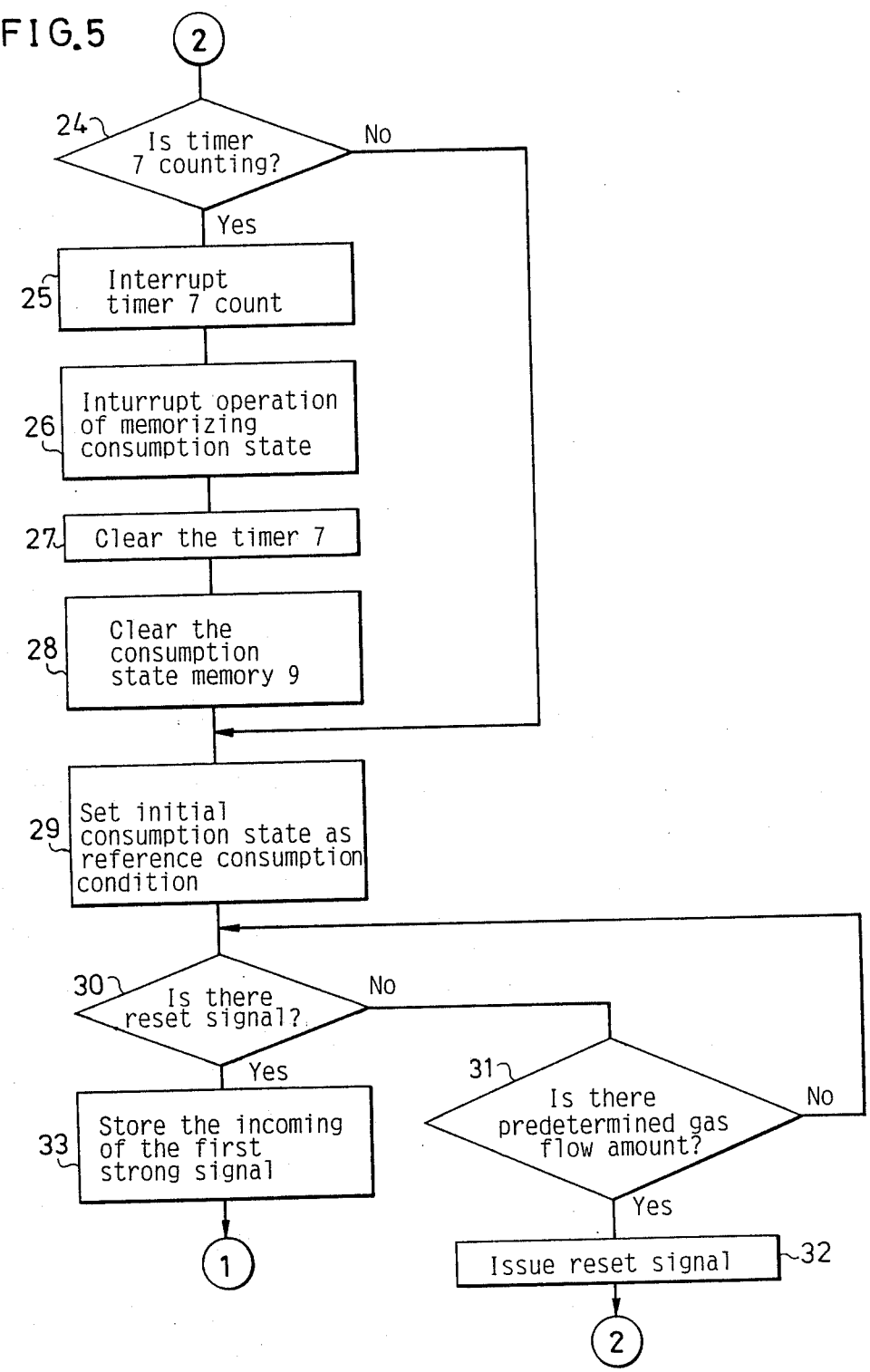
Figure 6:
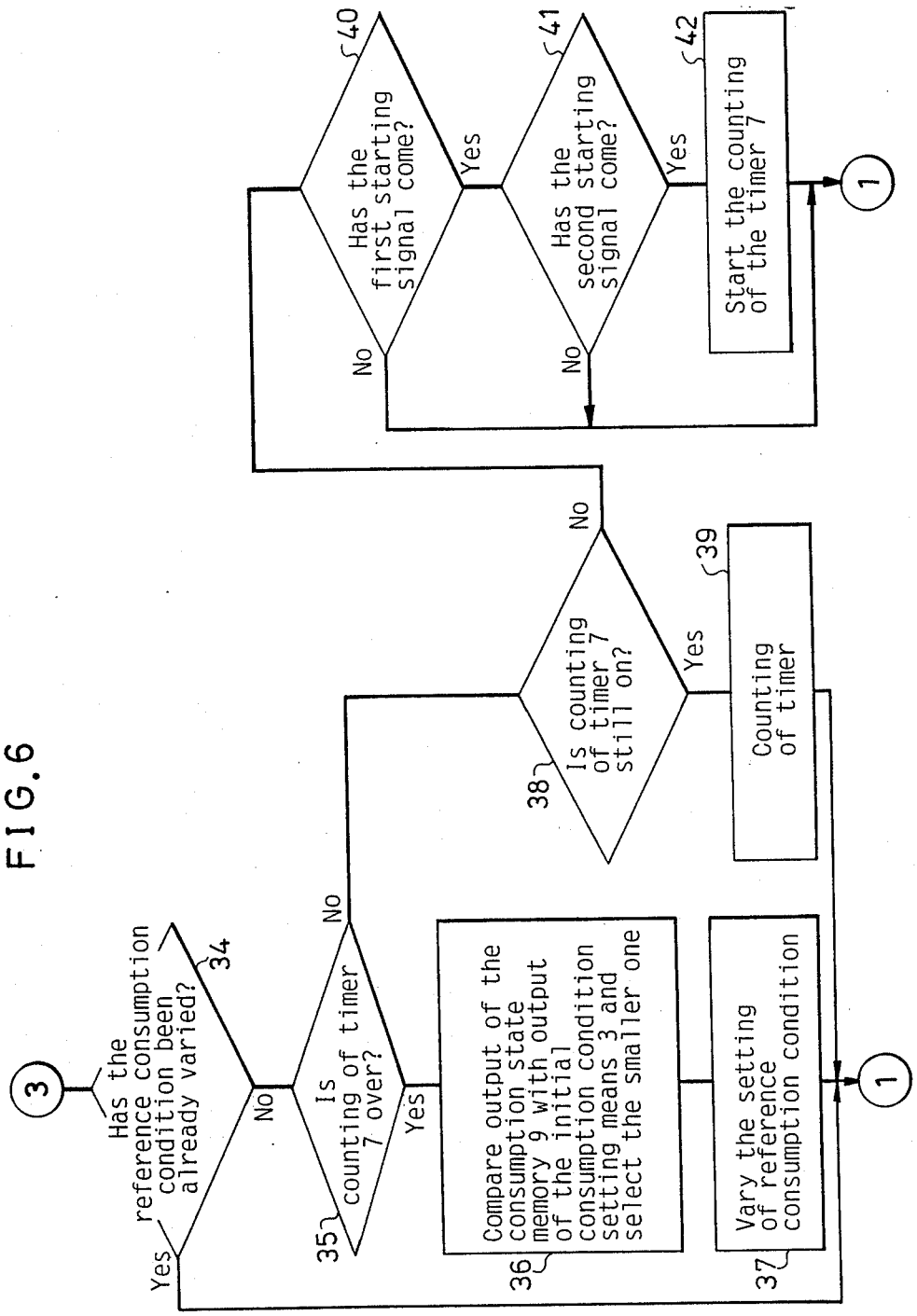

FIG. 4, FIG. 5 and FIG. 6 are respectively partial flow charts of the steps of operation of the gas shutoff apparatus in the first embodiment.

Referring to FIG. 4, an initial consumption condition is set for a reference consumption condition from the initial consumption condition setting means 3 (step 14). A gas flow rate is measured (step 15), and a consumption state is detected on the basis of the output signal of the flow rate measurement means 1 (step 16). In a step 17, operation of the timer 7 is examined, and when the timer 7 is in operation, the present consumption state is detected and the maximum consumption state thereof is memorized in the consumption state memory means 9 (step 18). When the timer 7 is not in operation, the second starting signal generator 12 examines whether the gas flow rate is above the predetermined level or not; and when the gas flow rate is above the level, the second starting signal is issued (step 20). In case when gas flow rate is below the level or when passing through the steps 18 or 20, the judging of the consumption state by the consumption state judging means 4 is made (step 21). Then, when the result of the juding is abnormal, the step branches to the step 23 of issuing shutoff signal; but when the judge result is normal, the step advances through a junction 3 and the point 3 of FIG. 6 to the step 34.

Referring to FIG. 5, the flow from the junction point (2) and thereafter is elucidated. In the step 24, whether the timer 7 is counting or not is examined; and when the timer 7 is in the counting, the counting is interrupted in the step 25. And the operation of the consumption state memory means 9 is interrupted in the step 26; and subsequently the timer 7 is cleared in the step 27, and the consumption state memory means 9 is also cleared, and in the step 29 the reference consumption condition is set with maximum limit value which is the initial consumption state. When the step 24 is not in the timer counting, the flow goes to the step 29. That is, after the gas consumption state has been judged abnormal (by the consumption state judging means 4) in the step 22 and the shutoff signal has been issued, the reference consumption condition is reset to be initialized, and the memory of previous variation of the reference consumption condition is also reset. Thereafter, the step 30 judges whether the reset signal generator 6 issues a reset signal or not. When there is no reset signal, the flow advances to the step 31 wherein whether there is a predetermined gas flow or not is checked; and when there is a gas flow at that time, a shutoff signal is issued again in the step 32 and the flow advances to the point (2) of FIG. 5. When there is no gas flow, the flows come back to the step 30 and checks whether there is the reset signal or not; and when there is the reset signal, the first starting signal is stored in the step 33, and the flow returns to the point (1) of FIG. 4.

Next, referring to FIG. 6, the flow from the branch point (3) is elucidated. In the step 34, whether the reference consumption condition is already varied or not yet varied is checked. And when it has been checked, the flow returns to the point (1) of FIG. 4. When the flow has not been varied, whether the timer has completed its time-counting or not is checked in the step 35. When the counting has been over, the output of the consumption state memory means 9 and output of the initial consumption condition setting means 3 are compared in the varying means for reference consumption condition 10 (the step 36), and either smaller one is selected and the reference consumption condition is varied thereto. When the time-counting has not yet completed yet in the step 35, whether the time-counting is still on or is over is checked in the step 38; and when the time-counting has not been completed, the counting is made continue in the step 39. When the time-counting has been completed, it is checked in the step 40 whether the first starting signal has come, or in the step 33 of FIG. 5 whether the first starting signal is stored or not. Then, when the first starting signal has come, in the step 41 it is checked whether the second starting signal has come or not; and when the second starting signal has come the counting of the timer 7 is started in the step 42. And the flow returns to the point (1) of FIG. 4 in the following cases: when the varying has been made in the step 34, when the flow goes through the steps 37 and 39, when the first starting signal has not come in the step 40, when the second starting signal has not come in the step 41 and when the flow goes through the step 42.

As mentioned above, in the gas shutoff apparatus in accordance with the present invention, a consumption state of the gas is always monitored and is compared with a predetermined reference consumption condition. Therefore, when the consumption state exceeds the reference consumption condition because of escape of the gas or significant increase of gas consumption, the consumption state is determined to be abnormal, and the shutoff means 5 is activated to shutoff supply of the gas. Consequently, gas explosion or gas poisoning can be prevented.

Furthermore, an actual consumption state of a consumer is measured during a predetermined time period measured by the timer 7, and a reference consumption condition is set on the basis of the measured consumption state. Consequently, character of the consumer in gas consumption is introduced into the reference consumption condition, and effect for preventing gas accident is significantly improved. And, by using two (the first and the second) starting signals for starting the time-counting and by providing the first starting signal generator 11 which responds to the reset signal of the shutoff means 5 and the second starting signal generator 12 which responds to the gas flow amount signal, the timer for determining time period for measuring the gas consumption state is actuated to start the time-counting only after actual gas consumption by the user. Therefore, meaningful and effective data can be collected, and the setting of the reference consumption data becomes appropriate.

Figure 7:
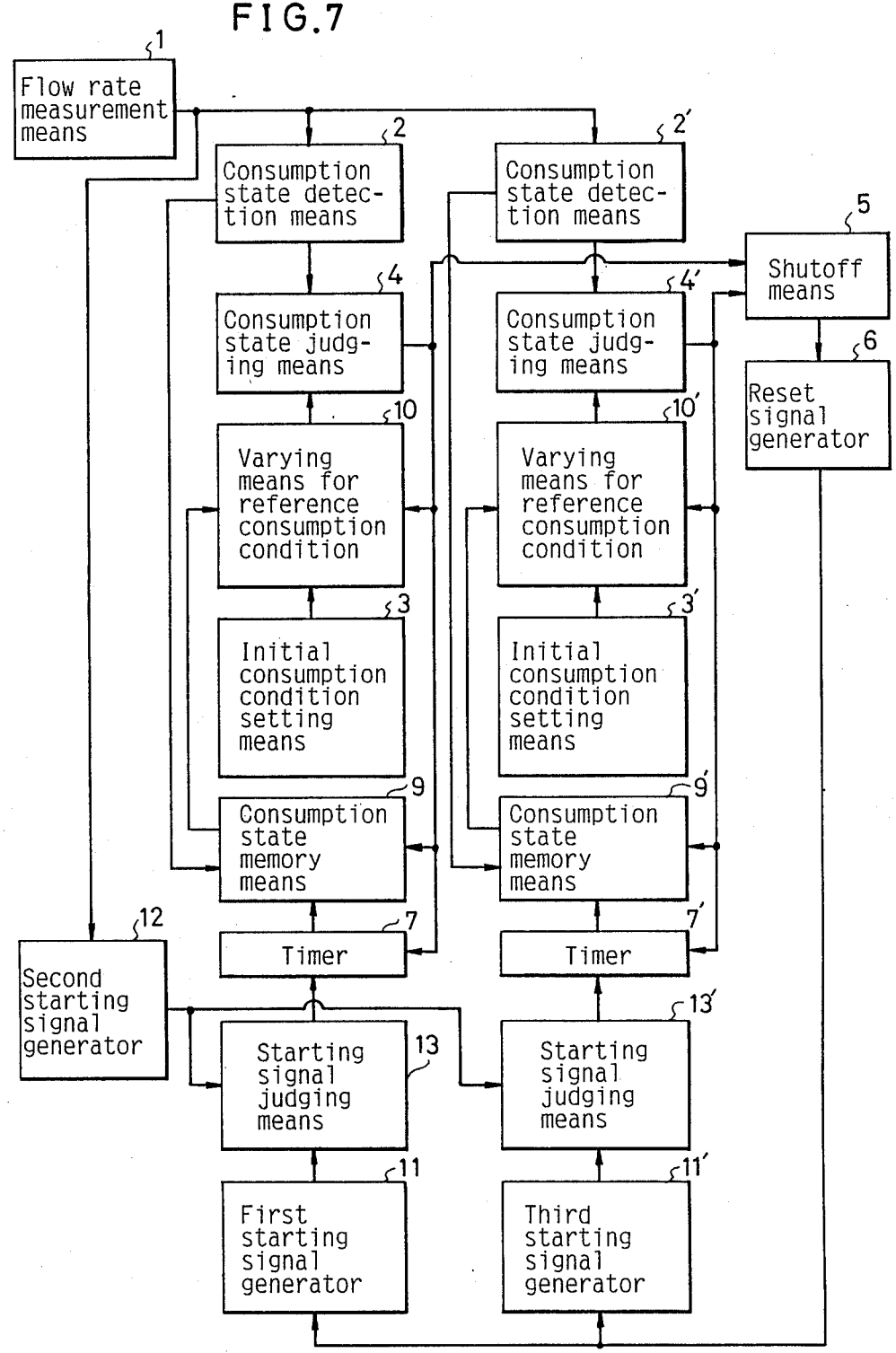
FIG. 7 is a block diagram of the gas shutoff apparatus of a second embodiment in accordance with the present invention.

FIG. 7 is a block diagram of a second embodiment of the gas shutoff apparatus in accordance with the present invention. Corresponding parts and components to the first embodiment are shown by the same numerals and marks, and the description thereon made in the first embodiment similarly apply. Differences and features of this second embodiment from the first embodiment are as follows.

The feature of this example is a configuration for enabling abnormal state checking by use of plural kinds of conditions. That is, the embodiment of FIG. 7 comprises a second sets of circuits 2′, 3′, 4′, 9′, 10′, 11′ and 13′ which are substantially the same as the circuits 2, 3, 4, 7, 9, 10, 11 and 13 of the first embodiment of FIG. 2, respectively, and similarly connected to the circuits 1, 5, 6 and 12.

When a second starting signal is given from the second starting signal generator 12 after a first starting signal has been given from the first starting signal generator 11, the starting signal judging means 13 judges that the starting signals are given in a predetermined sequential order and issues a starting signal for time-counting to the first timer 7. Similarly, when a second starting signal is given from the second starting signal generator after a third starting signal has been given from the third starting generator 11′, the second starting signal judging means 13′ judges that the starting signals are given in a predetermined sequential order and issues a starting signal for time-counting to the second timer 7′. The consumption state memory means 9 and 9′ store gas consumption condition during time-coutning period of the first timer 7 and the second timer 7′ under individual abnormality judging conditions, respectively. For example, the first consumption state memory means 9 stores shutoff condition on the gas flow rate, while the second consumption state memory means 9′ stores shutoff conditio on the time period of continuous gas consumption. Hereupon, the first timer 7 and the second timer 7′ are reset only when the consumption state judging means 4 and 4′ judge that an abnormal gas consumption state arises on their own side (or of own set), respectively. And the timer 7 or 7′ in the side (or of own set) wherein the timer 7 or 7′ has been reset in the above-mentioned step is actuated to start again for measuring the gas consumption state, only when the second starting signal generator 12 detects a gas consumption above a predetermined level after the first and the third starting signal generators 11 and 11' issue signal. By the way, at the initial starting time after installation to home of this apparatus, by means of the initial processing, the system is set in a stand-by state such that the timers 7 and 7' are both reset and they are actuated to start time-counting by the starting signal.

In this second embodiment, in either side of the plural sets of circuits, wherein a gas consumption state above the predetermined level is detected, a new gas consumption state measurement is started afresh individually apart from the other side. Therefore, among plural gas consumption equipments, only that wherein the gas consumption state previously exceeds the predetermined level is observed, and for the other side (set) of circuit wherein the gas consumption state have not varied, there is no varying of the reference consumption state. Therefore, there is no fear of lowering the safety level by lowering of the reference gas consumption condition for the kind of the gas consumption data.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A gas shutoff apparatus comprising:
   flow rate measurement means for generating a flow rate signal corresponding to a flow rate of gas in a gas supply line,
   consumption state detection means for detecting a consumption state represented by flow rate and a consumption time of the gas on the basis of said flow rate signal,
   initial consumption condition setting means comprising a memory for storing a reference consumption condition as an initial condition,
   consumption state judging means which compares said detected consumption state with said reference consumption condition and generates a gas shutoff signal in case that said consumption state exceeds from said reference consumption condition,
   a timer for measuring a predetermined time period,
   a first starting signal generator for generating a first starting signal,
   a second starting signal generator for generating a second starting signal upon reception of a gas flow rate above a predetermined level,
   a starting signal judging means which issues a timer-start signal to make said timer start counting when said second starting signal is received after reception of said first starting signal,
   consumption state memory means for memorizing a consumption state during a time period given by operation of said timer and for producing a consumption condition on the basis of said memorized consumption state,
   varying means for reference consumption condition for setting a varied reference consumption condition in said consumption state judging means,
   shutoff means for interrupting said gas supply by reception of said shutoff signal, and
   a reset signal generator for generating a reset signal to said first starting signal generator upon reception of signal of open-state from said shutoff means when it is opened.

2. A gas shutoff apparatus in accordance with claim 1 wherein
   said varying means varies the reference consumption condition immediately after starting of the operation of the apparatus to a new value basing on the maximum level of measured actual consumption states during a first time period, by multiplying a tolerance factor, which is between 1 and 2, on the maximum level, and
   when a measured actual consumption state exceeds said new value varies the reference consumption condition to another new value basing on the newly measured value by multiplying the tolerance factor on said varied new value, and thereafter repeating the same.

3. A gas shutoff apparatus comprising:
   flow rate measurement means for generating a flow rate signal corresponding to a flow rate of gas in a gas supply line,
   plural consumption state detection means for detecting consumption states represented by respective flow rates and consumption times of the gas on the basis of said flow rate signal,
   plural initial consumption condition setting means each comprising a memory for storing reference consumption conditions as an initial condition,
   plural consumption state judging means which respectively compares said detected consumption states with said reference consumption conditions and generates gas shutoff signals in respective cases that said consumption states exceed from said reference consumption conditions,
   plural timers respectively for measuring eachother independent predetermined time periods,
   plural first starting signal generators for generating plural first starting signals,
   one second starting signal generator for generating a second starting signal upon reception of a gas flow rate above a predetermined level,
   plural starting signal judging means which issue timer-start signals to make said timer start counting when said second starting signal is received after reception of said first starting signal,
   plural consumption state memory means for memorizing respective consumption state during a time period given by operation of said timers and for producing a consumption condition on the basis of said memorized consumption state,
   plural varying means for reference consumption conditions for setting varied reference consumption conditions in said consumption state judging means,
   shutoff means for interrupting said gas supply by reception of said shutoff signal, and
   a reset signal generator for generating a reset signal to said first starting signal generators upon reception of signal of open-state from said shutoff means when it is opened.

4. A gas shutoff apparatus in accordance with claim 3 wherein
   said varying means varies the reference consumption condition immediately after starting of the operation of the apparatus to a new value basing on the maximum level of measured actual consumption states during a first time period, by multiplying a tolerance factor, which is between 1 and 2, on the maximum level, and
   when a measured actual consumption states exceeds said new value varies the reference consumption condition to another new value basing on the newly measured value by multiplying the tolerance factor on said varied new value, and thereafter repeating the same.

* * * * *